(12) United States Patent
Yoshioka et al.

(10) Patent No.: US 6,726,961 B2
(45) Date of Patent: Apr. 27, 2004

(54) METHOD OF FORMING COATING

(75) Inventors: Manabu Yoshioka, Kariya (JP); Shigeyuki Sasaki, Nara (JP); Hifumi Egusa, Hirakata (JP); Atsuo Magoshi, Osaka (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/791,850

(22) Filed: Feb. 26, 2001

(65) Prior Publication Data

US 2002/0009550 A1 Jan. 24, 2002

(30) Foreign Application Priority Data

Feb. 25, 2000 (JP) .......................... 2000-049806

(51) Int. Cl.⁷ .............................. B05D 1/36; C08L 33/02
(52) U.S. Cl. .................... 427/407.1; 427/410; 524/500; 525/187
(58) Field of Search .............................. 427/410, 407.1; 106/14.13; 525/327.3, 187; 524/500

(56) References Cited

U.S. PATENT DOCUMENTS

| 3,247,139 A | * | 4/1966 | Christenson et al. | ....... 524/556 |
| 4,065,416 A | * | 12/1977 | Christenson et al. | ......... 524/56 |
| 5,196,485 A | * | 3/1993 | McMonigal et al. | ..... 525/327.3 |
| 5,334,420 A | | 8/1994 | Hartung et al. | .......... 427/407.1 |

FOREIGN PATENT DOCUMENTS

DE 41 23 080 A1 1/1993
JP 90 31 362 2/1997

OTHER PUBLICATIONS

Hawley's Condensed Chemical Dictionary, thirteenth edition.*

* cited by examiner

Primary Examiner—Erma Cameron
Assistant Examiner—Elena Tsoy
(74) Attorney, Agent, or Firm—Connolly Bove Lodge & Hutz LLP

(57) ABSTRACT

It is an object of the present invention to provide a method of forming a composite coating film having high flip-flop properties by applying a water-based base coat coating to a substrate, then applying a clear top coat coating thereonto and curing both coatings simultaneously while controlling the interlayer imbibing or inversion of coating films under high humidity conditions.

The present invention provides a method of forming a composite coating film by applying a water-based base coat coating to a substrate and then applying a clear top coat coating thereonto,
  wherein the water-based base coat coating comprises:
    a polyether polyol having at least 0.02 primary hydroxyl group, on average, per molecule, a number average molecular weight of 300 to 3,000 and a water tolerance of not less than 2.0; and a resin emulsion obtained by emulsion polymerization of an $\alpha, \beta$-ethylenically unsaturated monomer mixture having an acid value of 3 to 50 and containing at least 65% by weight of a (meth)acrylate ester whose ester moiety contains 1 or 2 carbon atoms.

17 Claims, No Drawings

METHOD OF FORMING COATING

FIELD OF THE INVENTION

The present invention relates to a method of forming a composite coating film on car bodies and so on and a composite coating as obtainable by the method.

PRIOR ART

Generally, coatings for automobiles are rich in organic solvent content and, therefore, the organic solvents evaporate in large amounts in the step of coating or baking for curing. As one of the measures for reducing the number of steps of treating them, studies have been made to formulate coatings in the water-based form.

Thus, for instance, Japanese Kokai Publication Hei-07-53913 discloses a water-based coating composition which comprises a resin obtained by neutralizing at least part of a polymer derived from an amide group-containing, ethylenically unsaturated monomer, an acidic group-containing, ethylenically unsaturated monomer and a hydroxyl-containing, ethylenically unsaturated monomer, together with an aqueous dispersion of carboxyl-containing acrylic resin particles. However, not only this but also the so-far known water-based base coat coatings in general are inferior in flip-flop properties of the metallic coating film, in particular, to solvent base coating compositions.

It is an object of the present invention to provide a method of forming a composite coating film having high flip-flop properties by applying a water-based base coat coating to a substrate, then applying a clear top coat coating thereonto and curing both coatings simultaneously while controlling the interlayer imbibing or inversion of coating films under high humidity conditions.

SUMMARY OF THE INVENTION

The present invention provides a method of forming a composite coating film by applying a water-based base coat coating to a substrate and then applying a clear top coat coating thereonto, wherein said water-based base coat coating comprises:
a polyether polyol having at least 0.02 primary hydroxyl group, on average, per molecule, a number average molecular weight of 300 to 3,000 and a water tolerance of not less than 2.0; and a resin emulsion obtained by emulsion polymerization of an α, β-ethylenically unsaturated monomer mixture having an. acid value of 3 to 50 and containing at least 65% by weight of a (meth) acrylate ester whose ester moiety contains 1 or 2 carbon atoms.

The invention also provides a method of forming a composite coating film as defined above, wherein said polyether polyol has at least one primary hydroxyl group in each molecule and has a hydroxyl value of 30 to 700, and further said polyether polyol preferably has at least three hydroxyl groups.

The invention further provides a method of forming a composite coating film as defined above, wherein said water-based base coat coating contains a polyester resin or an alkyl resin in each-molecule.

In a further aspect, the invention relates to a composite coating film as obtainable by the above method.

DETAILED DESCRIPTION OF THE INVENTION

In the following, the invention is described in further detail.

Water-based Base Coating

The water-based base coat coating to be used in-the method of forming a coating film according to the invention comprises a polyether polyol having at least 0.02 primary hydroxyl group, on average, per molecule, a number average molecular weight of 300 to 3,000 and a water tolerance of not less than 2.0; and a resin emulsion obtained by emulsion polymerization of an α, β-ethylenically unsaturated monomer mixture having an acid value of 3 to 50 and containing at least 65% by weight of a (meth) acrylate ester whose ester moiety contains 1 or 2 carbon atoms. The water-based base coat coating may contain a curing agent, another or other film-forming resins, a color pigment, a luster pigment, and/or another or other additives.

The polyether polyol to be contained in the water-based base coat coating has at least 0.02 primary hydroxyl group, on average, per molecule, a number average molecular weight of 300 to 3,000 and a water tolerance of not less than 2.0. By containing this polyether polyol, the coating films can be improved in flip-flop properties, water resistance and chipping resistance.

When a polyether polyol having less than 0.02 primary hydroxyl group, on average, per molecule is used, the resulting coating films will show low water resistance and low chipping resistance. The number of primary hydroxyl groups per molecule is preferably not less than 0.04. More preferably, each molecule has at least one hydroxyl group. From the viewpoints of water resistance and chipping resistance in coating films, it is preferred that the number of hydroxyl groups, inclusive not only of primary but also secondary and tertiary hydroxyl groups be preferably at least 3. From the hydroxyl value viewpoint, the hydroxyl value is preferably 30 to 700. When the hydroxyl value is below the lower limit, the curability will be low and the resulting coating films will have low water resistance and low chipping resistance. Above the upper limit, the resulting coating will be low in stability and the coating films obtained will show decreased water resistance. A hydroxyl value of 50 to 500 is particularly preferred.

When a polyether polyol having a number average molecular weight less than 300 is used, the resulting coating films will show decreased water resistance. When that molecular weight exceeds 3,000, the resulting coating films will show decreased curability and chipping resistance. A preferred range is 400 to 2,000. The molecular weight of such a polymeric material as referred to in the present specification is determined by GPC based on the styrene polymer standards.

On the other hand, the use of a polyether polyol having a water tolerance less than 2.0 results in low water dispersibility and poor coating film appearance. A water tolerance of not less than 3.0 is particularly preferred.

The term "water tolerance" is used herein to evaluate the degree of hydrophilicity and a higher value thereof means a higher level of hydrophilicity. The value of water tolerance, so referred to in the present specification, is determined by dispersing 0.5 g of the polyether polyol in 10 ml of acetone in a 100-ml beaker at 25° C., gradually adding deionized water to this mixture using a buret and determining the amount (ml) of deionized water required to cause the mixture to become turbid. This amount (ml) of deionized water is reported as the water tolerance value.

When a hydrophobic polyether polyol, for instance, is tested by this method, the polyether polyol is initially compatible well with acetone and, upon addition of a small amount of deionized water, becomes incompatible with acetone, with the result that the measurement system becomes turbid. Conversely, in the case of a hydrophilic polyether polyol, a polyether polyol higher in hydrophilicity requires a larger amount of deionized water for causing turbidity. In this way, this method can determine the extent of hydrophilicity/hydrophobicity of a polyether polyol.

The content of the above polyether polyol on the resin solids basis is preferably 1 to 40% by weight, more preferably 3 to 30% by weight. Above the upper limit, the resulting coating films will show low water resistance and low chipping resistance. Below the lower limit, the appearance of the coating films will become poor.

As the above polyether polyol, there may be mentioned compounds derived from an active hydrogen-containing compound, such as a polyhydric alcohol, a polyhydric phenol or a polybasic carboxylic acid, by addition of an alkylene oxide. The active hydrogen-containing compound includes, for example, water, polyhydric alcohols (dihydric alcohols such as ethylene glycol, diethylene glycol, trimethylene glycol, propylene glycol, 1,4-butanediol, 1,6-hexanediol, neopentyl glycol, 1,4-dihydroxymethylcyclohexane and cyclohexylene glycol, trihydric alcohols such as glycerol, trihydroxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol, trimethylolethane and trimethylolpropane, tetrahydric alcohols such as pentaerythritol, 1,2,3,4-pentanetetrol, 2,3,4,5-hexanetetrol, 1,2,4,5-pentanetetrol, 1,3,4,5-hexanetetrol, diglycerol and sorbitan, pentahydric alcohols such as adonitol, arabitol, xylitol and triglycerol, hexahydric alcohols such as dipentaerythritol, sorbitol, mannitol, iditol, inositol, dulcitol, talose and allose, octahydric alcohols such as sucrose, polyglycerol, etc.); polyhydric phenols [polyhydric phenols (pyrogallol, hydroquinone, phloroglucin, etc.), bisphenols (bisphenol A, bisphenol sulfone, etc.)]; polycabroxylic acids [aliphatic polycarboxylic acids (succinic acid, adipic acid, etc.), aromatic polycarboxylic acids (phthalic acid, terephthalic acid, trimellitic acid, etc.)], etc.; and mixtures of two or more of these. Particularly preferred as trihydric or polyhydric alcohols to be used in forming polyether polyols having at least 3 hydroxyl groups in each molecule are glycerol, trimethylolethane, trimethylolpropane, pentaerythritol, sorbitan, sorbitol and the like.

The above polyether polyols can be obtained by subjecting the above active hydrogen-containing compound and an alkylene oxide to addition reaction in the conventional manner, generally in the presence of an alkali catalyst, at ordinary pressure or under increased pressure at a temperature of 60 to 160° C. As said alkylene oxide, there may be mentioned ethylene oxide, propylene oxide, butylene oxide and like alkylene oxides, and these may be used singly or two or more of them may be used combinedly. When two or more are used, the addition may be effected in the manner of block addition or random addition.

The above polyether polyol may be a commercially available one. As examples, there may be mentioned Primepol PX-1000, Sannix SP-750 and PP-400 (all being products of Sanyo Chemical Industries) and PTMG-650 (product of Mitsubishi Chemical).

Further, for improving the pigment dispersibility therein, the above polyether polyol may be modified with a basic substance such as an amino resin, hydroxyethylethylenimine (e.g. Sogo Yakkols "HEA") or 2-hydroxypropyl-2-aziridinylethyl carboxylate (e.g. Sogo Yakko's "HPAC"), which is further mentioned later herein, as disclosed in Japanese Kokai Publication Sho-59-138269. The amount of the modifier is preferably 1 to 10% by weight based on the polyether polyol. An amount smaller than 1% by weight cannot produce a sufficient modifying effect. An amount larger than 10% by weight may impair the'stability of the modified polyether polyol.

The above resin emulsion, which is another essential component of the water-based base coat coating to be used in the method of forming a coating film according to the invention, is obtained by emulsion polymerization of an $\alpha$, $\beta$-ethylenically unsaturated monomer mixture having an acid value of 3 to 50 and containing at least 65% by weight of a (meth)acrylate ester whose ester moiety contains 1 or 2 carbon atoms.

When the amount of the above (meth)acrylate ester whose ester moiety contains 1 or 2 carbon atoms in the $\alpha$, $\beta$-ethylenically unsaturated monomer mixture is less than 65% by weight, the coating films obtained will be poor in appearance. The (meth)acrylate ester whose ester moiety contains 1 or 2 carbon atoms includes methyl (meth)acrylate and ethyl (meth)acrylate. In the present specification, "(meth)acrylate ester" includes, within the meaning thereof, both of "acrylate ester" and "methacrylate ester".

The $\alpha$, $\beta$-ethylenically unsaturated monomer mixture has an acid value of 3 to 50, preferably 7 to 40. An acid value less than 3 cannot lead to any improvement in workability and an acid value exceeding 50 will lead to decreased coating film water resistance. When, on the other hand, the water-based base coat coating is required to have curability, the $\alpha$, $\beta$-ethylenically unsaturated monomer mixture should have a hydroxyl value of 10 to 150, preferably 20 to 100. A hydroxyl value less than 10 will fail to provide sufficient curability while a hydroxyl value exceeding 150 will lead to decreased coating film water resistance. From the viewpoint of physical properties of coating films, it is preferred that the resin emulsion obtained by polymerization of the above $\alpha$, $\beta$-ethylenically unsaturated monomer mixture have a glass transition temperature between −20° C. and 80° C.

The $\alpha$, $\beta$-ethylenically unsaturated monomer mixture can have such an acid value and/or hydroxyl value as mentioned above by containing an acid group- or hydroxyl group-containing $\alpha$, $\beta$-ethylenically unsaturated monomer or monomers therein.

As the acid group-containing $\alpha$, $\beta$-ethylenically unsaturated monomer, there may be mentioned acrylic acid, methacrylic acid, acrylic acid dimer, crotonic acid, 2-acryloyloxyethyl phthalate, 2-acryloyloxyethyl succinate, 2-acryloyloxyethyl acid phosphate, 2-acrylamido-2-methylpropanesulfonic acid, $\omega$-carboxypolycaprolactone mono(meth)acrylate, isocrotonic acid, $\alpha$-hydroxy-$\omega$-((1-oxo-2-propenyl)oxy)poly(oxy(1-oxo-1,6-hexanediyl)), maleic acid, fumaric acid, itaconic acid, 3-vinylsalicylic acid, 3-vinylacetylsalicylic acid and the like. Among these, acrylic acid, methacrylic acid and acrylic acid dimer are preferred.

As the hydroxyl group-containing $\alpha$, $\beta$-ethylenically unsaturated monomer, there may be mentioned hydroxyethyl (meth)acrylate, hydroxypropyl (meth)acrylate, hydroxybutyl (meth)acrylate, allyl alcohol, methacryl alcohol, hydroxyethyl (meth)acrylate-ε-caprolactone adducts and the like. Preferred among these are hydroxyethyl (meth)acrylate, hydroxybutyl (meth)acrylate and hydroxyethyl (meth)acrylate-ε-caprolactone adducts.

The α, β-ethylenically unsaturated monomer mixture may contain another or other α, β-ethylenically unsaturated monomers. The other α, β-ethylenically unsaturated monomers include (meth) acrylate esters whose ester moiety contains 3 or more carbon atoms (e.g. n-butyl (meth) acrylate, isobutyl (meth)acrylate, tert-butyl (meth)acrylate, 2-ethylhexyl (meth)acrylate, lauryl (meth)acrylate, phenyl (meth)acrylate, isobornyl (meth)acrylate, cyclohexyl (meth) acrylate, tert-butylcyclohexyl (meth)acrylate, dicyclopentadienyl (meth)acrylate, dihydrodicyclopentadienyl (meth) acrylate, etc.), polymerizable amide compounds (e.g. (meth) acrylamide, N-methylol(meth)acrylamide, N,N-dimethyl (meth)acrylamide, N,N-dibutyl(meth)acrylamide, N,N-dioctyl(meth)acrylamide, N-monobutyl(meth)acrylamide, N-monooctyl(meth)acrylamide, 2,4-dihydroxy-4'-vinylbenzophenone, N-(2-hydroxyethyl)acrylamide, N-(2-hydroxyethyl)methacrylamide, etc.), polymerizable aromatic compounds (e.g. styrene, α-methylstyrene, vinyl ketones, tert-butylstyrene, p-chlorostyrene, vinylnaphthalene, etc.), polymerizable nitriles (e.g. acrylonitrile, methacrylonitrile, etc.), α-olefins (e.g. ethylene, propylene, etc.), vinyl esters (e.g. vinyl acetate, vinyl propionate, etc.), dienes (e.g. butadiene, isoprene, etc.), and so forth. One or more of these may be selected according to the intended purpose. For providing hydrophilicity with ease, the use of (meth)acrylamide is preferred.

The content of such α, β-ethylenically unsaturated monomer(s) except the (meth)acrylate ester whose ester moiety contains 1 or 2 carbon atoms in the α, β-ethylenically unsaturated monomer mixture should be selected at a level less than 35% by weight.

The resin emulsion to be contained in the water-based base coat coating of the invention is obtained by emulsion polymerization of the above α, β-ethylenically unsaturated monomer mixture. Here, the emulsion polymerization can be carried out by a method generally well known in the art. Specifically, it can be effected by dissolving an emulsifier in water or an aqueous medium containing an organic solvent such as an alcohol, as necessary, and adding dropwise the α, β-ethylenically unsaturated monomer mixture and a polymerization initiator thereinto with heating and stirring. It is also possible to add the α, β-ethylenically unsaturated monomer mixture emulsified beforehand using an emulsifier and water dropwise in the same manner.

Suited for use as the polymerization initiator are oil-soluble azo compounds (e.g. azobisisobutyronitrile, 2,2'-azobis(2-methylbutyronitrile), 2,2'-azobis(2,4-dimethylvaleronitrile), etc.), water-soluble azo compounds (e.g. anionic 4,4'-azobis(4-cyanovaleric acid) and cationic 2,2'-azobis(2-methylpropionamidine)); as well as oil-soluble redox system peroxides (e.g. benzoyl peroxide, p-chlorobenzoyl peroxide, lauroyl peroxide, tert-butyl perbenzoate, etc.) and water-soluble redox system peroxides (e.g. potassium persulfate, ammonium persulfate, etc.).

The emulsifier may be any of those commonly used in the art. Particularly preferred are, however, reactive emulsifiers such as Antox MS-60 (product of Nippon Nyukazai) Eleminol JS-2 (product of Sanyo Chemical Industries); Adeka Reasoap NE-20 (product of Asahi Denka Kogyo), Aqualon HS-10 (product of Dai-ichi Kogyo Seiyaku) and the like.

A chain transfer agent such as a mercaptan (e.g. lauryl mercaptan) and α-methylstyrene dimer may be used as necessary for controlling the molecular weight.

The reaction temperature depends on the initiator. Thus, with an azo initiator, for instance, it is 60 to 90° C. and, with a redox system, the reaction is preferably carried out at 30 to 70° C. Generally, the reaction time is 1 to 8 hours. The initiator amount relative to the total amount of the α, β-ethylenically unsaturated monomer mixture is generally 0.1 to 5% by weight, preferably 0.2 to 2% by weight.

The above emulsion polymerization may be carried out in two stages. Thus, part of the α, β-ethylenically unsaturated monomer mixture (α, β-ethylenically unsaturated monomer mixture 1) is first subjected to emulsion polymerization and then the remaining α, β-ethylenically unsaturated monomer mixture (α, β-ethylenically unsaturated monomer mixture 2) is further added to conduct the emulsion polymerization.

For forming a composite coating film having a high quality appearance, the α, β-ethylenically unsaturated monomer mixture 1 preferably contains an amide group-containing, α, β-ethylenically unsaturated monomer. In that case, it is more preferable for the α, β-ethylenically unsaturated monomer mixture 2 to be free of any amide group-containing, α, β-ethylenically unsaturated monomer. Since the α, β-ethylenically unsaturated monomer mixtures 1 and 2 combinedly constitute the above-mentioned α, β-ethylenically unsaturated monomer mixture, the above-mentioned requirements imposed on the α, β-ethylenically unsaturated monomer mixture are satisfied by the combination of the α, β-ethylenically unsaturated monomer mixtures 1 and 2.

The thus-obtained resin emulsion preferably has a particle diameter within the range of 0.01 to 1.0 μm. When the particle diameter is smaller than 0.01 μm, the workability improving effect will be little. A larger particle diameter than 1.0 μm may possibly impair the appearance of the resulting coating films. The particle size can be controlled by adjusting the monomer composition and/or emulsion polymerization conditions.

The above resin emulsion may be used at pH 5 to 10 by neutralizing with a base, as necessary. The stability of the resin is high in this pH range. The neutralization is preferably carried out before or after emulsion polymerization by adding a tertiary amine such as dimethylethanolamine and triethylamine.

The water-based base coat coating of the invention may contain a curing agent. The curing agent may be any of those used in coatings in general. As such, there may be mentioned amino resins, blocked isocyanates, epoxy compounds, aziridine compounds, carbodiimide compounds, oxazoline compounds and metal ions, and the like. From the viewpoints of coating film characteristics and production cost, amino resins and/or blocked isocyanates are generally used.

The amino resin as a curing agent is not particularly restricted but may be a water-soluble melamine resin or a water-insoluble melamine resin. From the viewpoint of the stability of the water-based base coat coating, amelamine resin having a water tolerance of not less than 3.0 is preferably used among other melamine resins. The water tolerance can be determined by the same method as mentioned hereinabove referring to the polyether polyol.

As the blocked isocyanate, there may be mentioned those products obtained by adding an active hydrogen-containing blocking agent to a polyisocyanate such as tolymethylene diisocyanate, hexamethylene diisocyanate, xylylene diisocyanate and isophorone diisocyanate and capable of regenerating isocyanato groups upon dissociation of the blocking agent when heated and reacting with a functional group(s) in the resin component(s) mentioned above.

When such a curing agent is contained, the content thereof is preferably 20 to 100 parts by weight per 100 parts by weight of the resin solids in the water-based base coat coatings. Outside the above range, insufficient curability will result.

The water-based base coat coating of the invention may contain another or other film-forming resins as necessary. Such resins are not particularly restricted but include acrylic resins, polyester resins, alkyd resins, epoxy resins, urethane resins and like film-forming resins.

The other film-forming resins have a number average molecularweightof 3,000 to 50,000, preferably 6,000 to 30,000. With a lower molecular weight than 3,000, the workability in application and the curability will be insufficient and, with a molecular weight exceeding 50,000, the nonvolatile matter content becomes excessively low in the coating step and the workability becomes rather poor.

The other film-forming resins preferably have an acid value of 10 to 100 mg KOH/g, more preferably 20 to 80 mg KOH/g. Above the upper limit, the water resistance of the coating film will decrease. Below the lower limit, the resin dispersibility in water will decrease. Further, the resins preferably have a hydroxyl value of 20 to 180 mg KOH/g, more preferably 30 to 160 mg KOH/g. Above the upper limit, the water resistance of the coating film will decrease while, below the lower limit, the coating film curability will decrease.

As the above film-forming resins, polyester resins or alkyd resins are preferred in view of the flip-flop properties or chipping resistance of the obtained coating film.

The above polyester resin can be obtained by condensation polymerization between acid components and alcohol components. The acid components are not restricted but include polyhydric carboxylic acids and their derivatives such as adipic acid, sebacic acid, isophthalic acid, phthalic anhydride, etc. Moreover, acid components also include compounds having a carboxylic acid group and a hydroxy group per molecule, e.g. dimethylolpropionic acid. Furthermore, the above alcohol components are not particularly restricted but include polyhydric alcohol compounds such as ethylene glycol, trimethylolpropane, neopentyl glycol and the like.

The above alkyd resins are not particularly restricted, and can be obtained by condensation polymerization of the above acid components, the above alcohol components and an oil such as coconut oil, linseed oil and the like.

Furthermore, the above film-forming resin may be neutralized with basic compounds such as tertiary amine such as dimethylethanolamine and triethylamine to thereby dissolve or disperse the resin in water.

Of the resin components in the water-based base coat coating, the proportions of the resin emulsion and other film-forming resins are such that the resin emulsion accounts for 5 to 95% by weight, preferably 10 to 85% by weight, more preferably 20 to 70% by weight, and the other film-forming resins account for 95 to 5% by weight, preferably 90 to 15% by weight, more preferably 80 to 30% by weight, based on the total resin solids. When the resin emulsion accounts for less than 5% by weight, sagging prevention may become insufficient and the appearance of the coating film may become poor and, at a content higher than 95% by weight, the resulting coating films will become poor in appearance.

The pigment for usein the water-based base coat coating to be used in the practice of the invention includes a luster pigment and a color pigment. The luster pigment is not particularly restricted in form and shape. It may further be colored. Preferably, however, it has a mean particle diameter ($D_{50}$) of 2 to 50 μm and a thickness of 0.1 to 5 μm. A pigment having a mean diameter of 10 to 35 μm is excellent in feeling of luster, hence is more preferred. Specifically, it includes colored or uncolored metal-made glitters, for example metals or alloys such as aluminum, copper, zinc, iron, nickel, tin, aluminum oxide and the like, and mixtures thereof. It includes interfering mica pigments, white mica pigments, graphite pigments glass take pigments and the like.

As the color pigment, on the other hand, there may be mentioned, for example, organic pigments such as azo chelate pigments, water-insoluble azo pigments, condensed azo pigments, phthalocyanine pigments, indigo pigments, perinone pigments, perylene pigments, dioxane pigments, quinacridone pigments, isoindolinone pigments and metal complex pigments as well as inorganic pigments such as chrome yellow, yellow iron oxide, iron oxide red, carbon black and titanium dioxide.

The total pigment weight concentration (PWC) in the water-based base coat coating is preferably 0.1 to 50%, still more preferably 0.5 to 40%, most preferably 1.0 to 30%. Above the upper limit, the coating films obtained will be poor in appearance. In cases where a luster pigment is contained, it is generally preferred that the pigment weight concentration (PWC) thereof be not more than 18.0%. Above the upper limit, the appearance of the coating film will become poor. More preferably, that PWC is 0.01 to 15.0%, most preferably 0.01 to 13.0%.

Further, in cases where the water-based base coat coating to be used in the practice of the invention contains a scaly luster pigment, the coating preferably contains a phosphoric acid group-containing acrylic resin. This phosphoric acid group-containing acrylic resin is obtained by copolymerizing a monomer represented by the general formula (I) given below with another ethylenic monomer.

$$CH_2=CXCO(OY)_nOPO(OH)_2 \qquad (I)$$

(In the formula, X represents a hydrogen atom or a methyl group, Y represents an alkylene group containing 2 to 4 carbon atoms and n represents an integer of 3 to 30.)

The phosphoric acid group-containing acrylic resin is used for improving the dispersibility of the scaly luster pigment. This resin preferably has an acid value of 15 to 200 mg KOH/g, a phosphoric acid group-due acid value of 10 to 150 mg KOH/g, and a number average molecular weight of 1,000 to 50,000. When the acid value is less than 15 mg KOH/g, the dispersion of the scaly luster pigment may not be sufficient in certain cases. When the acid value is in excess of 200 mg KOH/g, the water-based base coat coating may have poor storage stability in some instances. The phosphoric acid group-due acid value is more preferably 15 to 100 mg KOH/g out of the acid value of 15 to 200 mg KOH/g.

When, on the other hand, the number average molecular weight is below 1,000, the dispersing effect of the invention may not be fully produced in some instances. When it exceeds 50,000, the appearance of the coating film may become poor as the case may be. The phosphoric acid group-containing acrylic resin may have a hydroxyl value contributive to curing and the value is preferably 20 to 200 mg KOH/g.

The phosphoric acid group-containing acrylic resin is used preferably in an amount of 0.01 to 5 parts by weight, more preferably 0.1 to 4 parts by weight, most preferably 0.2 to 3 parts by weight, per 100 parts by weight of the resin solids in the coating. When the phosphoric acid group-containing acrylic resin is used in an excessively small amount, the water resistance of the coating film may decrease in certain cases. When the content of the phosphoric acid group-containing acrylic resin is excess, the resulting coating shows decreased storage stability.

As specific examples of the monomer represented by the above general formula (I), there may be mentioned acid phosphoxyhexa(oxypropylene) monomethacrylate and acid phosphoxydodeca (oxypropylene) monomethacrylate, and the like.

The above other ethylenic monomer is copolymerizable with the monomer of the general formula (I) and may be a monomer mixture comprising a plurality of species. It also serves to render the copolymer obtained, namely acrylic resin, curable by means of a curing agent. As specific examples, there may be mentioned monomers having an acid group (e.g. carboxyl group, sulfonic group) or a hydroxyl group.

The water-based base coat coating may contain another viscosity modifier to prevent imbibing with the top coat coating film and/or secure the workability in application. The viscosity modifier may be any of those generally showing thixotropic properties. As the viscosity modifier, there may be mentioned, for example, crosslinked or non-crosslinked resin particles, swollen dispersions of fatty acid amide, amide type fatty acids, polyamides such as long-chain polyaminoamide phosphates, polyethylene type ones such as colloidal swollen dispersions of oxidized polyethylene, organic acid smectite clays, montmorillonite and like organic bentonite type ones, inorganic pigments such as aluminum silicate and barium sulfate, and flat pigments capable of producing viscosity owing to the shape thereof.

Further, the water-based base coat coating to be used in the practice of the invention may contain a phosphate ester having a long-chain alkyl group containing 8 to 18 carbon atoms and having an HLB value of 3 to 12 so that the latter may serve as a corrosion inhibitor for the metal-made luster pigment, when such is used, or may improve the wettability of the luster pigment and improve the coating film physical properties.

The alkyl chain mentioned above preferably contains 8 to 18 carbon atoms. When the number of carbon atoms is less than 8, decreased wettability may result, leading to decreased adhesion. When the number of carbon atoms exceeds 18, the compound may precipitate out in the coatings, thus causing troubles. More preferably, the number of carbon atoms is 10 to 14, whereby the wettability becomes better and the adhesion is improved. The above compound has an HLB value of 3 to 12, preferably 4 to 8. This value is calculated from Griffin's weight fraction-based formula: $HLB=20\times(MH/M)$ [where MH means the molecular weight of the hydrophilic moiety and M means the molecular weight of the active agent]. The molecular weight of the phosphoric acid ester, sulfonic acid or carboxylic acid is used as the molecular weight of the hydrophilic moiety. Outside the above range, decreases in wettability will unfavorably be encountered.

As preferred compounds, there may be mentioned 2-ethylhexyl acid phosphate, mono- or di-isodecyl acid phosphate, mono- or di-tridecyl acid phosphate, mono- or di-lauryl acid phosphate, mono- or di-nonylphenyl acid phosphate and the like.

The above component is used preferably in an amount (as solid content) of 0.1 to 5% by weight, more preferably 0.2 to 2% by weight, based on the total resin solids. Below the lower limit, the adhesion will decrease while, above the upper limit, the water resistance will become low on the contrary.

The water-based base coat coating of the invention may contain, in addition to the above components, one or more of those additives generally used in coatings, such as surface modifiers, thickening agents, antioxidants, ultraviolet absorbers, antifoams, etc. The addition amount of these are within the ranges respectively well known in the art.

The method of preparing a coating in the practice of the invention is not particularly restricted but may be any of all the methods known in the art, inclusive of those to be mentioned later herein, for example the method comprising dispersing by kneading the pigment and other ingredients using a kneader or roll mill.

Clear Top Coat Coating

The clear top coat coating is not particularly restricted but may be any of clear coating containing a film-forming resin and a curing agent and other ingredients. It may contain a color pigment in an amount which will not impair the decorative nature of the undercoat. This clear coating may have a solvent-based or water-based form or a powder form.

As preferred examples of the solvent-based clear coating, there may be mentioned, from the viewpoint of transparency or acid etching resistance, for example, combinations of an acrylic resin and/or polyester resin with an amino resin and/or isocyanate, or acrylic resins and/or polyester resins having a carboxylic acid-epoxy curing system.

As examples of the water-based clear coating, there may be mentioned those containing a film-forming resin included among those mentioned hereinabove to be contained in the solvent-based clear coatings as rendered water-based one by neutralization with a base. This neutralization can be carried out before or after polymerization by adding a tertiary amine such as dimethylethanolamine and triethylamine.

As for the powder-form clear coating, ordinary powder coatings such as thermoplastic or thermosetting powder coatings can be used. Thermosetting powder coatings are preferred, however, since they give coatings having good physical properties. Specific examples of the thermosetting powder coating are epoxy, acrylic and polyester type powder clear coatings, among which acrylic powder clear coatings capable of providing good weathering resistance are particularly preferred.

Further, to the above clear coating, a viscosity modifier is preferably added to thereby secure the workability in application. The viscosity modifier may be any of those generally showing thixotropic properties. Usable as such are those mentioned hereinabove referring to the water-based base coat coating. The coating may contain a curing agent, a surface modifier and/or the like, when necessary.

The thickness of the clear coating film may vary according to the intended use but a thickness of 10 to 80 $\mu$m is useful in many instances. Above the upper limit, the image sharpness may decrease or troubles such as unevenness, pinhole formation or runs may occur in the step of application. Below the lower e limit, the substrate cannot be masked but film breakage may occur.

Substrate

The method of forming a coating film according to the invention can advantageously be applied to various substrates, such as metals, plastics and foamed bodies and, in particular, to metal surfaces and castings. It can most judiciously be applied to metal products capable of applying to cationic electrodeposition coating.

As the metal products, there may be mentioned products made of iron, copper, aluminum, tin, zinc and the like as well as alloys containing these metals. Specifically, mention may be made of bodies and parts of cars, trucks, motorcycles, buses and the like. Particularly, these metals are preferably subjected in advance to chemical conversion treatment with a phosphate or,chromate salt or the like.

An electrodeposition coating film may be formed on such chemically converted steel panel surface and, in that case, the electrodeposition coating may be a cationic or anionic type one. A cationic electrodeposition coating is preferred, however, since it gives composite coating films better in corrosion resistance.

As the plastics products, there may be mentioned products made of polypropylene resins, polycarbonate resins, urethane resins, polyester resins, polystyrene resins, ABS resins, vinyl chloride resins, polyamide resins and the like. Specifically, there may be mentioned spoilers, bumpers, mirror covers, grilles, door knobs and other automotive parts, and the like. These plastics products are preferably washed by vapor cleaning using trichloroethane or washed with a neutral detergent. Further, they may be coated with a primer for enabling electrostatic coating.

When necessary, an intermediate coating film may be formed on the above substrates. For forming the intermediate coating film, an intermediate coating is used. This intermediate coating contains a film-forming resin, a curing agent, one or more of various organic or inorganic color pigments and extender pigments, and so forth.

The above-mentioned film-forming resin is not particularly restricted. It is used in combination with the curing agent mentioned hereinabove referring to the water-based base coat coating. From the viewpoints of coating film characteristics and cost, an amino resin and/or an isocyanate is generally used as the curing agent.

Usable as the color pigment to be contained in the intermediate coating are those mentioned hereinabove referring to the water-based base coat coating in the same manner. Normally, a gray intermediate coating in which carbon black and titanium dioxide are used as main pigments, a set gray one matched in hue to the topcoat, or the so-called color intermediate coating in which various color pigments are used combinedly is preferred. Further, a flat pigment such as an aluminum and mica powder may be added.

In these intermediate coatings, there may be incorporated, in addition to the components mentioned above, one or more of those additives generally used in coatings, such as surface modifiers, antioxidants, antifoams, etc.

Method of Forming a Composite Coating Film

According to the method of the invention for forming a composite coating film, a base coating film and a clear coating film can be formed, using the water-based base coat coating and the clear coat coating, respectively, in that order on a substrate, on an electrodeposited coating film and an intermediate coating film formed thereon as necessary.

In applying the water-based base coat coating according to the invention to car bodies, coatings can be formed by multistage coating, preferably two-stage coating, using the electrostatic air spray coating technique or by the coating method combinedly using the electrostatic air spray coating technique and a rotary atomizer type electrostatic coater commonly known as "$\mu\mu$ (micromicro) bell", "$\mu$ (micro) bell" or "metallic bell", for instance.

The coating film thickness to be attained in applying the water-based base coat coating in the practice of the invention may vary according to the intended use but a thickness of 10 to 30 $\mu$m is useful in many instances. Above the upper limit, the image sharpness may decrease or troubles such as unevenness and runs may occur in the step of application. Below the lower limit, the substrate cannot be masked.

While, in carrying out the method of forming a coating film according to the invention, it is also possible to apply a clear top coating to the above base coat after baking thereof, it is preferable from the economy and environmental viewpoints to employ the wet-on-wet coating method which comprises applying the curing is carried out onto the uncured base coat to thereby form a clear coating film, since, by doing so, the drying for baking can be omitted. For obtaining good finish coating films, it is desirable that the uncured base coat is heated at 40 to 100° C. for 2 to 10 minutes prior to application of the clear top coat coating.

In practicing the method of forming a coating film according to the invention, the clear coating film applied after formation of the base coating film is formed for the purpose of smoothing the unevenness, twinklings and like effects caused by the base coating film and protecting the same. As for the specific method of application, it is preferable to form coatings by using a rotary atomizer type electrostatic coater such as the A $\mu\mu$ bell or $\mu$ bell mentioned above.

As for the dry film thickness of the clear coatings formed by the clear top coat coating, a thickness of about 10 to 80 $\mu$m is generally preferred and a thickness of about 20 to 60 $\mu$m is more preferred. Above the upper limit, troubles such as foaming or sagging may occur in the step of coating. Below the lower limit, the unevenness of the substrate cannot be masked.

The formation of the clear coating film to be obtained in the above manner is preferably carried out by the so-called two-coat one-bake method, as mentioned above, in which curing is carried out by baking the same together with the uncured base coat. The baking temperature is selected within the range of 80 to 180° C., preferably 120 to 160° C., whereby cured coating films with a high crosslinking density can be obtained. Above the upper limit, the coating films may become hard and brittle and, below the lower limit, a sufficient level of hardness cannot be obtained. The curing time may vary depending on the curing temperature but, at 120° C. to 160° C., 10 to 30 minutes is adequate.

The composite coating films formed according to the invention have, in many instances, a thickness of 30 to 300 $\mu$m, preferably 50 to 250 $\mu$m. Above the upper limit, the physical properties, such as thermal shock resistance, of the coatings decrease and, below the lower limit, the strength of the coating film itself lowers.

The method of the invention for forming a composite coating film, which uses a water-based base coat coating containing a specific polyether polyol and a resin emulsion, has made it possible to industrially and stably provide composite coating films excellent in flip-flop properties and various coating film physical properties even under high humidity conditions by forming a base coating film and a clear top coat in that order. Furthermore, when the coating contains a polyester resin or an alkyd resin, the coating film as obtained has more excellent flip-flop properties and chipping resistance.

EXAMPLES

The following specific examples illustrate the present invention in detail. They are, however, by no means limitative of the scope of the invention. In the following, "part(s)" means "part(s) by weight".

Production of Resin Emulsion A-1

A reaction vessel was charged with 126.5 parts of deionized water, and the temperature was raised to 80° C. with stirring in a nitrogen atmosphere. Then, a monomer emulsion (as the first-stage α, β-ethylenically unsaturated monomer mixture) composed of 45.21 parts of methyl acrylate, 27.37 parts of ethyl acrylate, 7.42 parts of 2-hydroxyethyl methacrylate, 0.5 part of Aqualon HS-10 (polyoxyethylene alkylpropenylphenyl ether sulfate ester, product of Daiichi Kogyo Seiyaku), 0.5 part of Adeka Reasoap NE-20 (α-[1-[(allyloxy)methyl]-2-(nonylphenoxy)ethyl]-ω-hydroxyoxyethylene, product of Asahi Denka Kogyo, 80% aqueous solution) and 80 parts of deionized water and an initiator solution composed of 0.24 part of ammonium persulfate and 10 parts of deionized water were added dropwise in parallel to the reaction vessel over 2 hours. After completion of the dropping, maturation was effected at the same temperature for 1 hour.

Further, at 80° C., a monomer emulsion (as the second-stage α, β-ethylenically unsaturated monomer mixture) composed of 15.07 parts of ethyl acrylate, 1.86 parts of 2-hydroxyethyl methacrylate, 3.07 parts of methacrylic acid, 0.2 part of Aqualon HS-10 and 10 parts of deionized water and an initiator solution composed of 0.06 part of ammonium persulfate and 10 parts of deionized water were added dropwise in parallel to the reaction vessel over 0.5 hour. After completion of the dropping, maturation was effected at the same temperature for 2 hours.

Then, after cooling to 40° C., the reaction mixture was filtered through a 400-mesh filter, and then adjusted to pH 6.5 by adding 67.1 parts of deionized water and 0.32 part of dimethylaminoethanol to give a resin emulsion (A-1) with a mean particle size of 150 nm, a nonvolative matter content of 20%, a solid matter acid value of 20 and a hydroxyl value of 40.

Production of Resin Emulsion A-2

Following the procedure of the above Production Example 1, synthesis was carried out by using, as the first-stage α, β-ethylenically unsaturated monomer mixture, 33.70 parts of methyl acrylate, 34.88 parts of ethyl acrylate, 7.42 parts of 2-hydroxyethyl methacrylate and 4.00 parts of acrylamide and, as the second-stage α, β-ethylenically unsaturated monomer mixture, 15.84 parts of ethyl acrylate, 1.86 parts of 2-hydroxyethyl methacrylate and 2.30 parts of methacrylic acid, to give a resin emulsion (A-2) with a mean particle size of 190 nm, a nonvolatile matter content of 20%, a solid acid value of 15 and a hydroxyl value of 40.

Production of Resin Emulsion A-3

Following the procedure of the above Production Example 1, synthesis was carried out by using, as the first-stage α, β-ethylenically unsaturated monomer mixture, 30.61 parts of methyl acrylate, 37.97 parts of ethyl acrylate, 7.42 parts of 2-hydroxyethyl methacrylate and 4.00 parts of acrylamide, to give a resin emulsion (A-3) with a mean particle size of 200 nm, a nonvolatile matter content of 20%, a solid acid value of 20 and a hydroxyl value of 40.

Production of Acrylic Resin B-1

A reaction vessel was charged with 23.89 parts of dipropylene glycol methyl ether and 16.11 parts of propylene glycol methyl ether, and the contents were heated to 105° C. with sitting in a nitrogen atmosphere. Then, 13.1 parts of methyl methacrylate, 68.4 parts of ethyl acrylate, 11.6 parts of 2-hydroxyethyl methacrylate, 6.9 parts of methacryclic acid and an initiator solution composed of 10.0 parts of dipropylene glycol methyl ether and 1 part of tert-butylperoxy 2-ethylhexanoate were added dropwise in parallel to the reactor over 3 hours. After completion of the dropping, maturation was effected at the same temperature for 0.5 hour.

Further, an initiator solution composed of 5.0 parts dipropylene glycol methyl ether and 0.3 part of tert-butylperoxy 2-ethylhexanoate was added dropwise to the reactor over 0.5 hour. After dropping, maturation was effected at the same temperature for 2 hours.

A portion (16.11 parts) of the solvent was distilled off at 110° C. under reduced pressure (70 torr) using a solvent removing apparatus, 204 parts of deionized water and 7.14 parts of dimethylaminoethanol were then added to give a solution of an acrylic resin (B-1). The thus-obtained solution of acrylic resin B-1 had a nonvolatile matter content of 30.0%, a solid matter acid value of 40, a hydroxyl value of 50 and a viscosity of 140 poises (E type viscometer, 1 rpm/25° C.).

Production of Acrylic Resin B-2

A one-liter reaction vessel equipped with a nitrogen inlet tube, stirrer, temperature adjusting device, dropping funnel and a condenser was charged with 76 parts of ethylene glycol monobutyl ether. Separately, a monomer solution was prepared by mixing up 15 parts of styrene, 63 parts of methyl methacrylate, 48 parts of 2-hydroxyethyl methacrylate, 117 parts of n-butyl acrylate, 27 parts of methacrylic acid, 30 parts of acrylamide and 3 parts of azobisisobutyronitrile. Of this monomer solution, 61 parts was added to the reaction vessel and the temperature was raised to 120° C. with stirring. Then, 242 parts of the monomer solution was further added over 3 hours and, then, the stirring was continued for 1 hour. An amide group-containing acrylic resin with a number average molecular weight of 12,000, a hydroxyl value of 70 mg KOH/g and an acid value of 58 mg KOH/g was obtained. Thereafter, 28 parts of diethanolamine and 200 parts of deionized water were added thereto to give a transparent and viscous, amide group-containing acrylic resin (B-2) with a nonvolatile matter content of 50%.

Polyether Polyol C-1-1

Primepol PX-1000 (bifunctional polyether polyol, number average molecular weight: 400, hydroxyl value: 278, primary/secondary hydroxyl value ratio=63/37, water tolerance: infinite, product of Sanyo Chemical Industries) was used.

Polyether Polyol C-1-2

PTMG 650 (bifunctional polyether polyol, number average molecular weight: 650, hydroxyl value: 175, primary/secondary hydroxyl value ratio=100/0, water tolerance: 3.0 ml, product of Mitsubishi Chemical) was used.

Polyether Polyol C-2

Sannix SP-750 (hexafunctional polyether polyol, number average molecular weight: 750, hydroxyl value: 494, primary/secondary hydroxyl value ratio=2/98, water tolerance: infinite, product of Sanyo Chemical Industries) was used.

Polyether Polyol C-3

A reaction vessel equipped with a stirrer was charged with 90 parts of PP-400 (bifunctional polyether polyol, number average molecular weight: 400, hydroxyl value: 280, primary/secondary hydroxyl value ratio=2/98, water tolerance: infinite, product of Sanyo Chemical Industries) and 10 parts of U-Van 28–70W (butylated melamine, product of Mitsui Chemical) and the mixture was stirred at 80° C. for 1 hour. The thus-obtained melamine-cocondensation product polyether polyol was used.

Curing Agent D-1

Cymel 204 (mixed alkylated melamine resin, water tolerance 3.6 ml, product of Mitsui Cytec) was used.

Curing Agent D-2

A reaction vessel equipped with a stirrer, nitrogen inlet tube, condenser and thermometer was charged with 840 parts of hexamethylene diisocyanate and, after dilution with 609 parts of methyl isobutyl ketone, 0.9 part of dibutyltin laurate was added and, after raising the temperature to 50° C., 223.5 parts of trimethylolpropane was added gradually so that the resin temperature might not exceed 60° C. Then, 435 parts of methyl ethyl ketone oxime was added so that the resin temperature might not exceed 70° C. The mixture was maintained at 70° C. for 1 hour until the isocyanato group-due absorption in infrared absorption spectrum has substantially disappeared. Thereafter, the mixture was diluted with 32 parts of n-butanol. A blocked isocyanate was thus synthesized. The blocked isocyanate obtained had a solid content of 70%.

Synthesis of a Phosphoric Arid Group-containing Acryic Resin

A one-liter reaction vessel equipped with a stirrer, a temperature adjusting device and a condenser was charged with 40 parts of ethoxypropanol. Thereto was added dropwise 121.7 parts of a monomer solution composed of 4 parts of styrene, 35.96 parts of n-butyl acrylate, 18.45 parts of ethylhexyl methacrylate, 13.92 parts of 2-hydroxyethyl methacrylate, 7.67 parts of methacrylic acid, a solution (40 parts) of 20 parts of Phosmer PP (acid phosphoxyhexa (oxypropylene) monomethacrylate, product of Unichemical) in 20 parts ethoxypropanol and 1.7 parts of azobisisdbutyronitrile at 120° C. over 3 hours, followed by further 1 hour of stirring.

The resin obtained had an acid value of 105 mg KOH/g, of which the acid value attributable to the phosphoric acid group was 55 mg KOH/g, a hydroxyl value of 60 mg KOH/g and a number average molecular weight of 6, 000. The product occurred as an acrylic varnish with a nonvolatile matter content of 63%.

Production of a Polyester Resin F-1

A reaction vessel was charged with 22.3 parts of isophthalic acid, 19.9 parts of phthalic anhydride, 15.4 parts of adipic acid, 0.1 parts of trimethylol propane, 37.1 parts of neopentyl glycol, 5.2 parts of dimethylol propionic acid, 0.1 parts of dibutyltin oxide. The mixture was heated to 170° C. with stirring, and then heated to 220° C. over 3 hours while removing byproduct water due to condensation reaction. The reaction mixture was cooled when it has the solid acid value of 25. After cooling to 80° C., 3.2 parts of dimethylethanolamine, 204.4 parts of deionized water were added thereto. The polyester resin F-1 obtained had a nonvolatile matter content of 30%, a solid acid value of 25, a hydroxy value of 28 and a number average molecular weight of 4000.

Production of an Alkyd Resin F-2

A reaction vessel was charged with 18.1 parts of isophthalic acid, 16.1 parts of phthalic anhydride, 12.5 parts of adipic acid, 7.7 parts of trimethylol propane, 20.7 parts of neopentyl glycol, 5.7 parts of dimethylol propionicacid, 19.2 parts of coconut oil, dibutyltin oxide. The mixture was heated to 170° C. with stirring, and then heated to 220° C. over 3 hours while removing byproduct water due to condensation reaction, followed by removing water by azeotropic distillation with xylene of 2% of solid matter weight. The reaction mixture was cooled when it has the solid acid value of 25. After cooling to 80° C., 3.3 parts of dimethylethanolamine, 206.9 parts of deionized water were added thereto. The alkyd resin F-2 obtained had a nonvolatile matter content of 30%, a solid acid value of 25, a hydroxy value of 28 and a number average molecular weight of 4000.

Example 1

Production of a Water-based Metallic Hase Coat Coating

The resin emulsion A-1 (275 parts) obtained in the above production example, 10 parts of a 10% (by weight) aqueous solution of dimethylethanolamine, 33 parts of the acrylic resin B-1, 10 parts of the polyether polyol C-1-1, 25 parts of the curing agent D-1, 21 parts of Alpaste MH 8801 (aluminum pigment, product of Asahi Chemical Industry) (as luster pigment E-1), 5 parts of the phosphoric acid group-containing acrylic resin and 0.3 part of lauryl acid phosphate were blended and, after attaining uniform dispersion, a water-based metallic base coat coating was obtained.

Method of Forming a Coating Film

Zinc phosphate-treated dull steel panels, 0.8 mm thick, 30 cm long and 40 cm wide, which had been coated with a cationic electrodeposition coating ("Powertop U-50", product of Nippon Paint) in a dry film thickness of 20 $\mu$m by electrodeposition, followed by 30 minutes of baking at 160° C., were coated with a gray intermediate coating ("Orga P-2", polyester-melamine coating, product of Nippon Paint) diluted beforehand to a viscosity of 25 seconds (as determined at 20° C. using a No. 4 Ford cup) so as to attain a dry film thickness of 35 $\mu$m in two stages using an air spray gun, and baking was effected at 140° C. for 30 minutes.

After cooling, the water-based metallic coating produced in the above manner was diluted with deionized water to a viscosity of 30 seconds (measured at 20° C. using a No. 4 Ford cup). The dilution was applied in two stages so as to attain a dry film thickness of 20 $\mu$m at room temperature (25° C.) and a humidity of 85% using a model "$\mu\mu$ Bell COPES-IV" coater for water base coatings (product of ABB Industries). One minute of interval setting was effected between the two coating operations. After the second coating operation, setting was effected for an interval of 5 minutes. Then, preheating was performed at 80° C. for 5 minutes.

After preheating, the coated panels were allowed to cool to room temperature, "Orga TO-563 Clear" (acrylic-melamine base clear coating, product of Nippon Paint) was applied, as a clear top coating, thereto in one stage so as to attain a dry film thickness of 40 $\mu$m, followed by 7 minutes of setting. The coated panels were then baked at 140° C. for 30 minutes using a drier.

The coated panels were evaluated for flip-flop properties according to the criteria given below by measuring the IV value using an ALCOPE LMR-100 surface profile measuring apparatus (product of Kansai Paint)

<Evaluation Criteria for Flip-flop Properties>

5: IV value not less than 200;

4: IV value not less than 180 but less than 200;

3: IV value not less than 160 but less than 180;

2: IV value not less than 140 but less than 160;

1: IV value less than 140.

Separately, the coated panels obtained were immersed in warm water (40° C.) for 10 days, then washed and, an hour later, observed by the eye for appearance evaluation according to the following criteria:

<Evaluation Criteria for Warm Water Resistance>

5: No change;

4: Slight swelling on the interface of warm water;

3: Slight darkening on the interface of warm water;

2: Blackening on the interface of warm water;

1: Swelling on the interface of warm water and blackening of the coating film.

The coated panels obtained were further evaluated for chipping resistance by causing 50 g of No. 7 crushed stone to collide against the coating film cooled to −20° C. at an angle of 45 degrees from a distance of 35 cm under an air pressure of 4.0 kg/cm² using a Gravello testing machine (product of Suga Shikenki) and the extent of peeling was observed by the eye and evaluated according to the following criteria:

5: No peeling at all;
4: Small peeling areas with low frequency of occurrence;
3: Small peeling areas with rather high frequency;
2: Large peeling areas with low frequency;
1: Large peeling areas with high frequency.

The results obtained in the above manner are shown in Table 1.

Examples 2 and 8

In Examples 2 to 5 and 8, water-based metallic base coat coatings were prepared by compounding the coating components specified in Table 1 in the same manner as in Example 1. In Example 6, a coating was prepared using no phosphoric acid group-containing acrylic resin and using 25 parts of the curing agent D-2 in lieu of the curing agent D-1; the other components were the same as in Example 1. In Example 7, a coating was prepared using no phosphoric acid group-containing acrylic resin and using 12.5 parts of the curing agent D-1 plus 12.5 parts of the curing agent D-2 in lieu of 25 parts of the curing agent D-1; the other ingredients were the same as in Example 1. Composite coating films were formed using the metallic base coatings obtained and were evaluated in the same manner as in Example 1.

Example 9

The resin emulsion A-1 (137.5 parts) obtained in the above production example, 5 parts of a 10% (by weight) aqueous solution of dimethylethanolamine, 33 parts of the acrylic resin B-1, 91.7 parts of the polyester resin F-1, 10 parts of the polyether polyol C-1-1, 25 parts of the curing agent D-1, 21 parts of Alpaste MH 8801 (aluminum pigment, product of Asahi Chemical Industry) (as luster pigment E-1), 5 parts of the phosphoric acid group-containing acrylic resin and 0.3 part of lauryl acid phosphate were blended and, after attaining uniform dispersion, a water-based metallic base coat coating was obtained. Composite coating films were formed using the metallic base coatings obtained and were evaluated in the same manner as in Example 1.

Example 10

A water-based metallic base coating was prepared in the same manner as in Example 9 by compounding the same components except that 91.7 parts of the alkyd resin F-2 obtained in the above method were used in lieu of polyester resin F-1. Using the metallic base coating obtained, composite coating films were formed and evaluated in the same manner as in Example 1.

Comparative Example 1

A water-based metallic base coating was prepared in the same manner as in Example 1 by compounding the same components except that the use of the polyether polyol was omitted. Using the metallic base coating obtained, multi-layer coating films were formed and evaluated in the same manner as in Example 1.

The evaluation results obtained in the above examples and comparative example are summarized in Table 1.

TABLE 1

|  | Example |  |  |  |  |  |  |  |  |  | Compar Ex. |
|---|---|---|---|---|---|---|---|---|---|---|---|
|  | 1 | 2 | 3 | 4 | 5 | 6 | 7 | 8 | 9 | 10 | 1 |
| Coating composition |  |  |  |  |  |  |  |  |  |  |  |
| Resin emulsion | A-1 | A-2 | A-3 | A-3 | A-3 | A-3 | A-3 | A-3 | A-1 | A-1 | A-3 |
| Other film-forming resin | B-1 | B-1 | B-1 | B-1 | B-1 | B-1 | B-1 | B-2 | B-1/F-1 | B-1/F-2 | B-1 |
| Polyether polyol | C-1-1 | C-1-1 | C-1-2 | C-2 | C-3 | C-1-1 | C-1-1 | C-1-1 | C-1-1 | C-1-1 | No |
| Curing agent | D-1 | D-1 | D-1 | D-1 | D-1 | D-2 | D-1/D-2 | D-1 | D-1 | D-1 | D-1 |
| Luster pigment | E-1 | E-1 | E-1 | E-1 | E-1 | E-1 | E-1 | E-1 | E-1 | E-1 | E-1 |
| Phosphoric acid group-containing acrylic resin | Yes | Yes | Yes | Yes | Yes | No | No | Yes | Yes | Yes | No |
| Evaluation results |  |  |  |  |  |  |  |  |  |  |  |
| Flip-flop properties | 4 | 4 | 5 | 5 | 5 | 4 | 4 | 3 | 5 | 5 | 2 |
| Water resistance | 5 | 5 | 5 | 5 | 4 | 3 | 3 | 4 | 5 | 5 | 2 |
| Chipping resistance | 3 | 4 | 4 | 4 | 4 | 5 | 4 | 4 | 5 | 4 | 1 |

As the examples of the invention indicate, the coating film interface imbibing or inversion can be controlled and thus composite coating films having a high IV value and good chipping resistance can be obtained owing to the interaction between the polyether polyol and resin emulsion in the water-based metallic base coating.

What is claimed is:

1. A method of forming a composite coating film by applying a water-based base coat coating to a substrate and then applying a clear top coat coating thereonto,
wherein said water-based base coat coating comprises:
a polyether polyol having at least 0.02 primary hydroxyl group, on average, per molecule, a number average molecular weight of 300 to 3,000 and a water tolerance of not less than 2.0; and
a resin emulsion obtained by emulsion polymerization of an α, β-ethylenically unsaturated monomer mixture having an acid value of 3 to 50 and containing at least 65% by weight of a (meth)acrylate whose ester moiety contains 1 to 2 carbon atoms and wherein the polyether polyol is obtained by the addition of at least one of ethylene oxide, propylene oxide and butylene oxide to at least one of water, polyhydric alcohol, polyhydric phenol and polybasic carboxylic acid.

2. The method of forming a composite coating film according to claim 1,
wherein said polyether polyol has at least one primary hydroxyl group in each molecule and has a hydroxyl value of 30 to 700.

3. The method of forming a composite coating film according to claim 1, wherein said polyether polyol has at least three hydroxyl groups in each molecule.

4. The method of forming a composite coating film according to claim 1, wherein said water-based base coat coating comprises a polyester resin or an alkyd resin as a film-forming resin.

5. The method of forming a composite coating film according to claim 2, wherein said polyether polyol has at least three hydroxyl groups in each molecule.

6. The method of forming a composite coating film according to claim 2, wherein said water-based base coat coating comprises a polyester resin or an alkyd resin as a film-forming resin.

7. The method of forming a composite coating film according to claim 3, wherein said water-based base coat coating comprises a polyester resin or an alkyd resin as a film-forming resin.

8. The method of forming a composite coating film according to claim 5, wherein said water-based base coat coating comprises a polyester resin or an alkyd resin as a film-forming resin.

9. The method of forming a composite coating film according to claim 1,
wherein said water-based base coat coating comprises a luster pigment.

10. The method of forming a composite coating film according to claim 9;
wherein said polyether polyol has at least one primary hydroxyl group in each molecule and has a hydroxyl value of 30 to 700.

11. The method of forming a composite coating film according to claim 9,
wherein said water-based base coat coating comprises a polyester resin or an alkyd resin as a film-forming resin.

12. The method of forming a composite film according to claim 10,
wherein said polyether polyol has at least three hydroxyl groups in each molecule.

13. The method of forming a composite coating film according to claim 10,
wherein said water-based base coating comprises a polyester resin or an alkyd resin as a film forming resin.

14. The method of claim 1 wherein said $\alpha,\beta$-ethylenically unsaturated monomer mixture can optionally further comprise at least one monomer selected from the group consisting of a (meth) acrylate ester whose ester moiety contains 3 or more carbon atoms, (meth) acrylamide, N-mothylol (meth) acrylamide, N,N-dimethyl (meth) acrylamide, N,N-dibutyl (meth) acrylamide, N,N-dioctyl (meth) acrylamide, N-monobutyl (meth) acrylamide, N-monobutyl (meth) acrylamide, 2,4dihydroxy-4'-vinylbenzophenone, N-(2-hydroxyethyl) acrylamide, N-(2-hydroxyethyl) methacrylamide, a polymerizable aromatic compound, a polymerizable nitrile, $\alpha$-olefin, vinyl ester and a diene.

15. The method of claim 1 wherein said $\alpha, \beta$-ethylenically unsaturated monomer mixture can optionally further comprise at least one monomer selected from the group consisting of n-butyl (meth) acrylate, isobutyl (meth) acrylate, tert-butyl (meth)acrylate, 2-ethylhexyl (meth) acrylate, lauryl (meth) acrylate, phenyl (meth) acrylate, isobornyl (meth) acrylate, cyclohexyl (meth) acrylate, tert-butylcyclohexyl (meth) acrylate, dicyclopentadienyl (meth) acrylate, dihydrodicyclopentadienyl (meth) acrylate, (moth) acrylamide, N-methylol (meth) acrylamide, N,N-dimethyl (meth) acrylamide, N,N-dibutyl (meth) acrylamide, N,N-dioctyl (meth) acrylamide, N-monobutyl (meth) acrylamide, N-monooctyl (meth) acrylamide, 2,4-dihydroxy-4'-vinylbenzophenone, N2-hydroxyethyl) acrylamide, N-(2-hydroxyethyl) methacrylamide, styrene, $\alpha$-methylstyrene, vinyl ketones, tert-butylstyrene, p-chlorostyrene, vinylnaphthalene, acrylonitrile, methacrylonitrile, ethylene, propylene, vinyl acetate, vinyl propionate, butadiene, and isoprene.

16. The method of claim 1 wherein when said $\alpha, \beta$-ethylenically unsaturated monomer mixture further comprises a polymerizable amide, said polymerizable amide is selected from the group consisting of (meth) acrylamide, N-methylol (meth) acrylamide, N,N-dimethyl (meth) acrylamide, N,N-dibutyl (meth) acrylamide, N,N-dioctyl (meth) acrylamide, N-monobutyl (meth) acrylamide, N-monoctyl (meth) acrylamide, N-(2-hydroxyethyl) acrylamide, and N-(2-hydroxyethyl) methacrylamide.

17. The method of claim 1 wherein said $\alpha, \beta$-ethylenically unsaturated monomer mixture further comprises (meth) acrylamide.

\* \* \* \* \*

UNITED STATES PATENT AND TRADEMARK OFFICE
CERTIFICATE OF CORRECTION

PATENT NO. : 6,726,961 B2  Page 1 of 1
APPLICATION NO. : 09/791850
DATED : April 27, 2004
INVENTOR(S) : Marabu Yoshioki et al.

It is certified that error appears in the above-identified patent and that said Letters Patent is hereby corrected as shown below:

In Claim 14, at Col. 20, line 9, "N-mothylol" should read -- N-methylol --.

In Claim 14, at Col. 20, line 12, "N-monobutyl" should read -- N-monooctyl --.

In Claim 14, at Col. 20, line 13, "2,4dihydroxy" should read --2, 4-dihydroxy --.

In Claim 15, at Col. 20, line 26, "(moth)" should read -- (meth) --.

In Claim 15, at Col. 20, line 31, "N2-hydroxyethyl" should read -- N-(2-hydroxyethyl) --.

Signed and Sealed this

Ninth Day of January, 2007

JON W. DUDAS
*Director of the United States Patent and Trademark Office*